(12) United States Patent
Hawkinson et al.

(10) Patent No.: US 8,615,926 B1
(45) Date of Patent: Dec. 31, 2013

(54) BAG CONSTRUCTED OF WEED SUPPRESSION MATERIAL FOR PACKAGING GROUND COVER MATERIAL

(71) Applicant: R & J East, Inc., Jacksonville, FL (US)

(72) Inventors: Robert Neal Alfred Hawkinson, Orange Park, FL (US); James Earl Hawkinson, Orange Park, FL (US)

(73) Assignee: R & J East, Inc., Jacksonville, FL (US)

( * ) Notice: Subject to any disclaimer, the term of this patent is extended or adjusted under 35 U.S.C. 154(b) by 0 days.

(21) Appl. No.: 13/921,531

(22) Filed: Jun. 19, 2013

Related U.S. Application Data

(62) Division of application No. 12/795,841, filed on Jun. 8, 2010, now Pat. No. 8,522,476.

(51) Int. Cl.
*A01G 7/00* (2006.01)
*A01G 9/02* (2006.01)

(52) U.S. Cl.
USPC ................................. 47/65.8; 47/9

(58) Field of Classification Search
USPC ............................... 47/9, 56, 65.8
See application file for complete search history.

(56) References Cited

U.S. PATENT DOCUMENTS

| | | |
|---|---|---|
| 2,309,702 A | 1/1943 | Kirschenbaum |
| 3,005,287 A | 8/1959 | Dudley |
| 3,839,139 A | 10/1974 | Ito et al. |
| 3,870,583 A | 3/1975 | Gidge |
| 3,888,418 A | 6/1975 | Seith et al. |
| 3,962,823 A | 6/1976 | Zipperer, III |
| 4,090,325 A | 5/1978 | Mushin et al. |
| 4,209,945 A | 7/1980 | Dent et al. |
| 4,545,145 A | 10/1985 | Torrance |
| 4,782,626 A | 11/1988 | Shanley et al. |
| 5,193,306 A | 3/1993 | Whisenant |
| 5,241,783 A | 9/1993 | Krueger |
| 5,389,116 A | 2/1995 | Byrd |
| 5,421,123 A | 6/1995 | Sakate et al. |
| 5,524,387 A | 6/1996 | Whisenant |
| 6,016,628 A | 1/2000 | Schlosser |
| 6,185,864 B1 | 2/2001 | Lee |
| 6,233,867 B1 | 5/2001 | Gibson |
| 6,312,823 B1 | 11/2001 | El-Afandi et al. |
| 6,412,218 B2 | 7/2002 | Lee |
| 6,446,386 B1 | 9/2002 | Holloway |
| 6,523,989 B2 | 2/2003 | Carty |
| 6,681,521 B1 | 1/2004 | Holloway |
| 7,303,084 B2 | 12/2007 | McPhillips |
| 7,303,670 B2 | 12/2007 | McPhillips |
| 7,422,682 B2 | 9/2008 | McPhillips |
| 2003/0044242 A1 | 3/2003 | Chen |
| 2004/0103580 A1 | 6/2004 | Huang et al. |
| 2005/0025397 A1 | 2/2005 | Zhao |
| 2005/0064136 A1 | 3/2005 | Turner et al. |
| 2005/0161407 A1 | 7/2005 | McPhillips |
| 2006/0185235 A1 | 8/2006 | Bono |
| 2007/0251191 A1 | 11/2007 | Maltais et al. |
| 2007/0283621 A1 | 12/2007 | Holloway |
| 2009/0158646 A1 | 6/2009 | Moore, Jr. et al. |

*Primary Examiner* — Monica Williams
(74) *Attorney, Agent, or Firm* — Smith Gambrell & Russell LLP

(57) ABSTRACT

A bag constructed of a weed suppression material for packaging a ground cover material. When the bag is in a closed configuration, the bag serves as a container for shipping, handling, and storage of the ground cover material. When the bag is opened and unfolded, and the ground cover material within the bag is spread over the opened and unfolded bag, the bag serves as a layer of weed suppression material on top of underlying soil and beneath the ground cover.

14 Claims, 4 Drawing Sheets

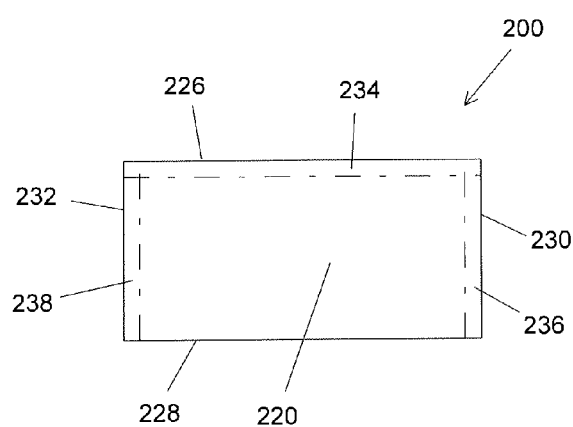
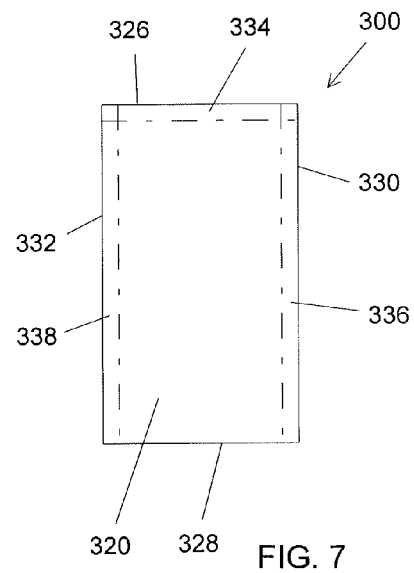
FIG. 5
FIG. 7
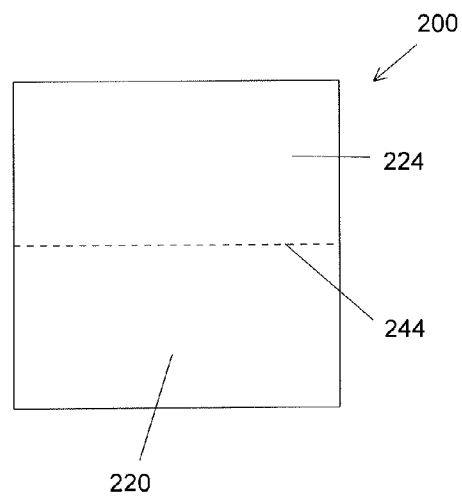
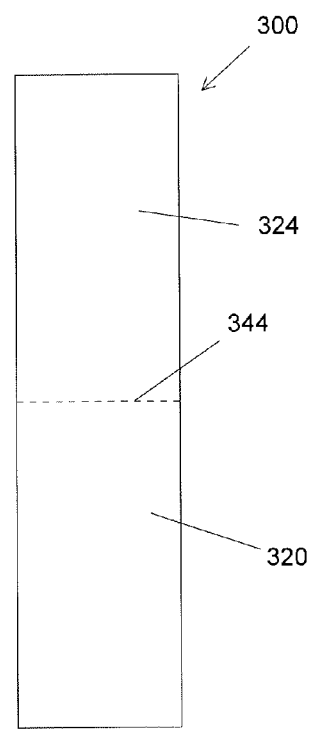
FIG. 6
FIG. 8

BAG CONSTRUCTED OF WEED SUPPRESSION MATERIAL FOR PACKAGING GROUND COVER MATERIAL

CROSS REFERENCE TO RELATED PATENT APPLICATIONS

This application is a divisional of U.S. patent application Ser. No. 12/795,841 filed Jun. 8, 2010, which claims priority from U.S. Provisional Patent Application No. 61/219,137, filed Jun. 22, 2009, which is hereby incorporated by reference.

FIELD OF THE INVENTION

This invention generally relates to a bag for packaging ground cover material, and more particularly relates to a bag constructed of weed suppression material to be used in conjunction with the spreading of the ground cover material in a planting bed.

BACKGROUND OF THE INVENTION

In a planting bed for flowers and/or vegetables, a ground cover material, including mulches and rock material, composted soil (garden soil or potting soil), and ground synthetic particles, is often spread on top of the soil among the flowering plants and/or the vegetables plants. The ground cover material offers several advantages. The ground cover can be selected to maintain soil moisture or to inhibit soil compaction. In the case of flower beds, the ground cover material can be selected to create a pleasing aesthetic appearance to show off the flowers.

In order to lower the maintenance required for planting beds, particularly to inhibit the growth of weeds in the planting beds, a separate weed suppression material is often laid on top of the soil and under the ground cover.

SUMMARY OF THE INVENTION

The present invention addresses both the need for a ground cover material and the need for a weed suppression material for a planting bed. Particularly, the present invention comprises a bag constructed of a weed suppression material for packaging a ground cover material. When the bag of the present invention is in its closed configuration, the bag serves as a container for shipping, handling, and storage of the ground cover material. When installing the ground cover material in the planting bed, the bag of the present invention is opened and unfolded, and the ground cover material within the bag is spread over the opened and unfolded bag. Consequently, the bag serves as a layer of weed suppression material on top of the underlying soil and beneath the ground cover.

The ground cover material that may be used in connection with the bag of the present invention may include mulches, such as pine straw, chipped wood bark, grain straws, shredded wood materials, or other mulches known to those of ordinary skill in the landscaping art. The ground cover may also include rock material, including sand, crushed stone, gravel, pea gravel, graded stone, shale, or other rock materials known to those of ordinary skill in the landscaping art. The ground cover may also include ground synthetic particles, such as ground rubber particles and ground plastic particles. The ground cover may also include composted soil.

The weed suppression material for the bag of the present invention may be a sheet of perforated plastic, biodegradable/compostable plastic film, paper, cardboard or cloth fabric. For most planting bed applications, the weed suppression material should be porous in order to allow water and air to pass through the weed suppression material to the roots of the plants in the underlying soil. The bag of the present invention may be constructed with an impervious temporary outer coating or an impervious internal liner to ensure integrity of the bag during shipping, handling, and storage. The temporary coating or liner dissolves when the bag comes in contact with moist soil, or the temporary liner is manually removed when the bag is opened. Further, the weed suppression material of the bag may be biodegradable within a 3 to 24 month period of time to ensure suppression of weeds during the growing season and to ensure that there is no build up of the weed suppression material in the planting bed from growing season to growing season. The weed suppression material of the bag may also be compostable. The weed suppression material of the bag may be colored on the inside to match the color of the ground cover packaged in the bag so that when in place, the bag, underlying the ground cover material, will not be obtrusive in the planting bed. The weed suppression material comprising the bag may also be coated or impregnated with an additive including fertilizer, pesticide, insecticide, herbicide, or beneficial microbes for release into the underlying soil. Because the area of the unfolded bag is a known parameter, the impregnated bag provides an accurate dose of fertilizer, pesticide, insecticide, herbicide, or beneficial microbes to the underlying soil. Further, the weed suppression material comprising the bag may also be coated with or impregnated with an antimicrobial so that the bag does not mildew or mold during shipping, handling or storage.

In applications where the ground cover is spread over a large area without planting beds, the weed suppression material may be impervious to both air and water to ensure total weed control by depriving the weeds in the underlying soil of moisture and air. In such circumstances, the impervious weed suppression material may also be used to direct the flow of water toward drainage facilities or toward adjacent plant beds to increase the water available for such adjacent plant beds. Such an impervious weed suppression material may include, among other materials, a plastic film or a coated paper laminate.

The bag constructed of weed suppression material in accordance with the present invention has indicia on its outer surface indicating where and how the bag should be opened. Particularly, the indicia may comprise sewn seams, tear strips, perforations, or printed cut lines to facilitate opening and use of the bag as a weed suppression material. In one embodiment of the bag in accordance with the present invention, the bag may have sewn seams, tear strips, perforations, or printed cut lines arranged in the form of a capital "I", with the leg of the "I" running along the center of the length of the bag and with the top and bottom bars of the "I" running along the end edges of the bag. In a second embodiment of the bag in accordance with the present invention, the bag may have sewn seams, tear strips, perforations, or printed cut lines arranged in the form of a capital "I", with the leg of the "I" running along the center of the width of the bag and with the top and bottom bars of the "I" running along the side edges of the bag. In a third embodiment of the bag in accordance with the present invention, the bag may have sewn seams, tear strips, perforations, or printed cut lines on both end edges and on one of the side edges of the bag. In a third embodiment of the bag in accordance with the present invention, the bag may have sewn seams, tear strips, perforations, or printed cut lines on both side edges and on one of the end edges of the bag.

In use, the bag of the present invention containing the ground cover (mulch, rock, composted soil, or ground synthetic particles) is laid on the exposed soil adjacent the plants. The bag is then opened by means of indicia such as sewn seams, tear strips, perforations, or printed cut lines. Once the bag has been opened, the bag is unfolded around the plants in the planting bed. Holes are cut or torn in the weed suppression material to accommodate the plants in the planting bed. The installation is completed by spreading the ground cover over the exposed portions of the unfolded bag. Alternatively, the bag and groundcover may be installed before plants are installed in the planting bed. In that circumstance, holes are cut or torn in the bag after installation of the bag and ground cover, and the plants are inserted through the holes in the bag into the underlying soil. Where composted soil, such as garden soil is used as ground cover, the bag is opened and placed flat over the underlying soil. The composted soil in the bag is then spread over the open bag. The plants are then planted through a hole in the open bag and grow through the composted soil on top of the bag while the weeds in the underlying soil are suppressed.

The relationship between the size of the bag and the amount of ground cover contained in the bag provides a measure for the proper installation of the ground cover to the proper depth. In other words, the amount of ground cover included in the bag is just the right amount to cover the bag to the proper depth when the bag is unfolded. In order to accommodate the volume of ground cover material in the bag, the bag may also include one or more extra panels attached adjacent the sewn seams, tear strips, perforations, or printed cut lines so that, when the bag is unfolded with the extra panels, additional area of weed suppression material is available to accommodate the volume of ground cover material in the bag.

Further objects, features and advantages will become apparent upon consideration of the following detailed description of the invention when taken in conjunction with the drawings and the appended claims.

BRIEF DESCRIPTION OF THE DRAWINGS

FIG. 5 is a top plan view of a third embodiment of an unopened bag with sewn seams, tear strips, perforations, or printed cut lines along two end edges and along one side edge in accordance with the present invention.

FIG. 6 is a top plan view of the bag of FIG. 5 opened and unfolded in accordance with the present invention.

FIG. 7 is a top plan view of a fourth embodiment of an unopened bag with sewn seams, tear strips, perforations, or printed cut lines along two sides edges and along one end edge in accordance with the present invention.

FIG. 8 is a top plan view of the bag of FIG. 7 opened and unfolded in accordance with the present invention.

DETAILED DESCRIPTION OF THE PREFERRED EMBODIMENTS

Figure 1:
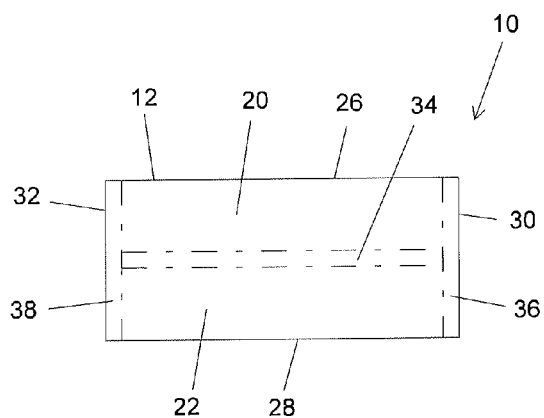
FIG. 1 is a top plan view of a first embodiment of an unopened bag with sewn seams, tear strips, perforations, or printed cut lines in an "I" shape in accordance with the present invention.
Figure 2:
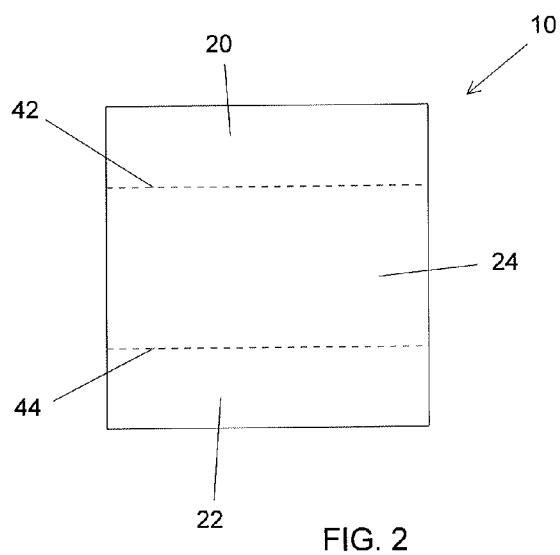
FIG. 2 is a top plan view of the bag of FIG. 1 opened and unfolded in accordance with the present invention.
Figure 11:
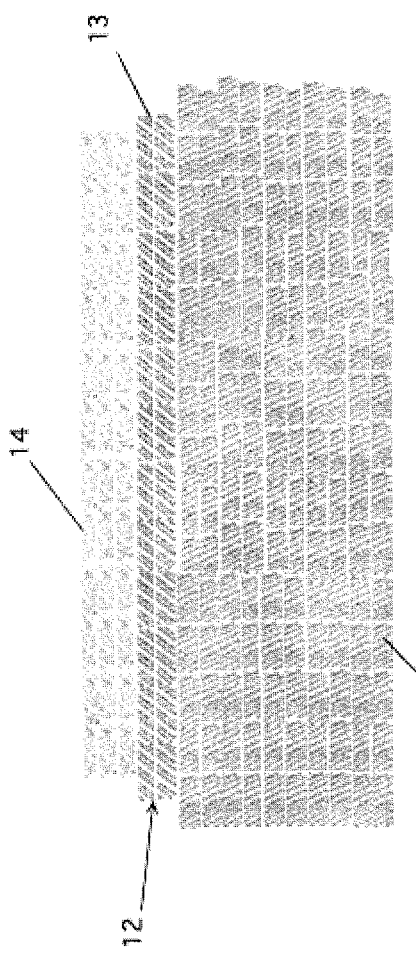
FIG. 11 is a section view of planting bed soil, of a weed suppression material of the bags of FIGS. 1-10 opened and unfolded on top of the soil, and ground cover on top of the weed suppression material all in accordance with the present invention.

Referring now to the drawings, a first embodiment of a bag 10, constructed of weed suppression material 12 in accordance with the present invention, is illustrated FIGS. 1-2. FIG. 1 shows the bag 10 in its closed configuration. FIG. 2 shows the bag 10 in its open configuration. The bag 10 is formed of a weed suppression material 12. The weed suppression material 12 for the bag 10 may be a sheet of perforated plastic, biodegradable/compostable plastic film, paper, cardboard, or cloth fabric (woven or nonwoven). For most planting bed applications, the weed suppression material 12 may be a layer 13 (FIG. 11) of porous material in order to allow water and air to pass through the weed suppression material 12 to the underlying soil 18 (FIG. 11). In practice, the porous layer 13 may be implemented by three layers of wet strength Kraft paper. The number and thickness of individual layers comprising porous layer 13 may be adjusted to meet the strict requirements of shipping, handling and storage on one hand, and proper porosity for use as a weed suppression material.

Figure 12:
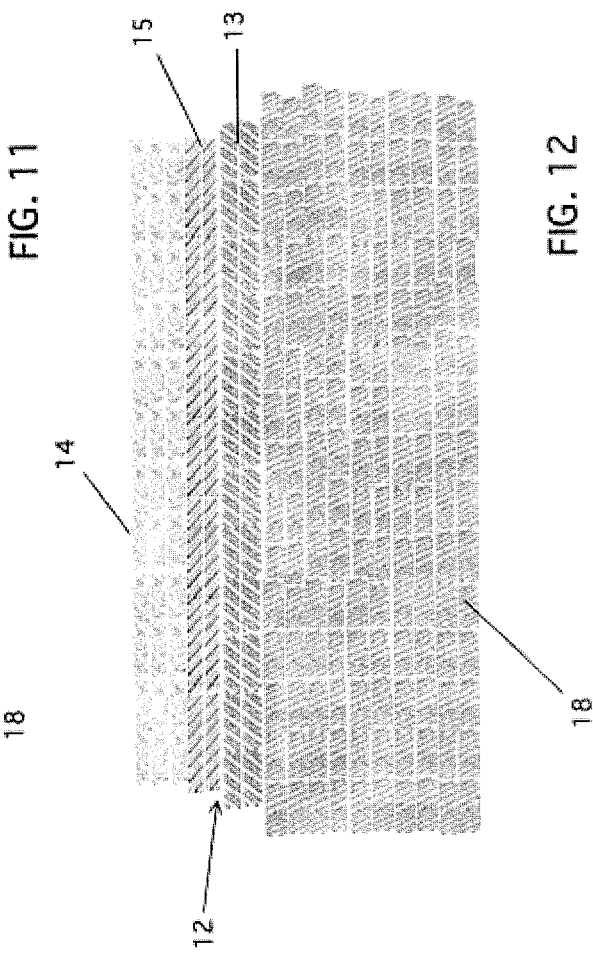
FIG. 12 is a section view of the planting bed soil, of a multilayer weed suppression material of the bags of FIGS. 1-10 opened and unfolded on top of the soil, and ground cover on top of the weed suppression material all in accordance with the present invention.

The bag 10 of the present invention may also be constructed with an impervious temporary outer coating (not shown) or an impervious temporary internal liner 15 (FIG. 12) to ensure integrity of the bag 10 during shipping, handling, and storage. The temporary impervious coating or liner 15 dissolves when the weed suppression material 12 bag comes in contact with moist soil 18, or the temporary impervious liner 15 is manually removed when the bag is opened. Further, the weed suppression material 12 of the bag 10 may be biodegradable within a 3 to 24 month period of time to ensure suppression of weeds during the growing season and to ensure that the weed suppression material 12 does not build up in the planting bed from growing season to growing season. The weed suppression material 12 of the bag 10 may also be compostable.

The weed suppression material 12 of the bag 10 may be colored on the inside of the bag 10 to match the color of the ground cover 14 (FIGS. 11 and 12) packaged in the bag 10 so that when in place, the bag 10, underlying the ground cover material, will not be obtrusive in the planting bed. The weed suppression material 12 comprising the bag 10 may also be impregnated with fertilizer, pesticide, insecticide, herbicide, or beneficial microbes for release into the underlying soil. Boric acid may be coated onto the weed suppression material 12 to reduce flammability and to provide an insecticide. Further, the weed suppression material comprising the bag may also be coated with or impregnated with an antimicrobial so that the bag does not mildew or mold during shipping, handling, and storage. Because the area of the unfolded bag 10 (FIG. 2) is a known parameter, the impregnated bag 10 provides an accurate does of fertilizer, pesticide, insecticide, herbicide, or beneficial microbes to the underlying soil. Likewise, because the area of the unfolded bag is known, the amount of ground cover contained in the bag can be measured to ensure that when ground cover is spread on the open bag, the ground cover is at the correct depth.

As previously indicated, where the ground cover is spread over a large area without planting beds, the weed suppression material 12 in the bag 10 may be impervious to both air and water to ensure total weed control by depriving the weeds in the underlying soil of moisture and air. In such circumstances, the impervious weed suppression material 12 may also be used to direct the flow of water toward drainage facilities or toward adjacent plant beds to increase the water available for such adjacent planting beds. Such an impervious weed suppression material may include, among other materials, a plastic film or a coated paper laminate. The plastic film or the coated paper laminate may be either permanent or biodegradable/compostable depending on the application. The plastic film or the coated paper laminate may also be colored to blend with the color of the ground cover material.

With continuing reference to FIG. 1, the bag 10 comprises a first front panel 20, a second front panel 22, and a back panel 24. The first front panel 20, the second front panel 22, and the back panel 24 are all connected together at a first side edge 26, a second side edge 28, a first end edge 30, and a second end edge 32 to form the bag 10 for packaging the ground cover material 14 during shipping, handling, and storage. The bag 10 further has a center tear strip 34, a first end tear strip 36, and a second end tear strip 38. (The term "tear strip" as used hereinafter should be understood to refer to sewn seams, tear strips, perforations, or printed cut lines.) The center tear strip 34 interconnects the first front panel 20 and the second front panel 22. The first end tear strip 36 connects the edges of the first front panel 20, the second front panel 22, and the back panel 24 along the first end edge 30. The second end tear strip 38 connects the edges of the first front panel 20, the second front panel 22, and the back panel 24 along the second end edge 32.

In order to use the bag 10 as a weed suppression material, the center tear strip 34, the first end tear strip 36, and the second end tear strip 38 are removed from the bag 10. With the tear strips 34, 36, and 38 removed, the bag 10 is then unfolded as shown in FIG. 2. A first side fold line 42 corresponds to the first side edge 26 of the bag 10 (FIG. 1), and a second side fold line 44 corresponds to the second side edge 28 of the bag 10 (FIG. 1). Once the bag 10 has been unfolded as shown in FIG. 2, the ground cover material 14 is spread over the bag 10 in its open and unfolded configuration.

Although the bag 10 has been described in connection with the use of tear strips 34, 36, and 38, as indicated above, other opening means, such as sewn seams, perforations, or printed cut lines may be used in connection with the present invention. Particularly, the printed cut lines direct the user to those places on the bag that should be cut in order to open the bag 10 to its open and unfolded configuration shown in FIG. 2. Instead of printed cut lines, perforations may be provided to facilitate the opening of the bag 10 along the edges and center. In another embodiment, instead of a tear strip, the edges 30 and 32 may be sealed by a standard sewn closure which is easily opened by pulling on the thread of the sewn closure. Also, the center tear strip 34 may be accessible from the inside of the bag once the edges have been opened by removing the tear strips 36 and 38.

Figure 3:
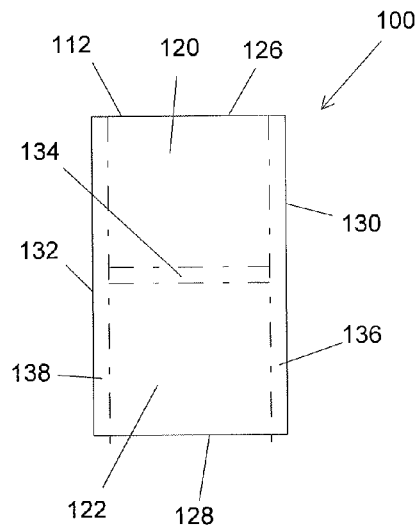
FIG. 3 is a top plan view of a second embodiment of an unopened bag with sewn seams, tear strips, perforations, or printed cut lines in an "I" shape in accordance with the present invention.
Figure 4:
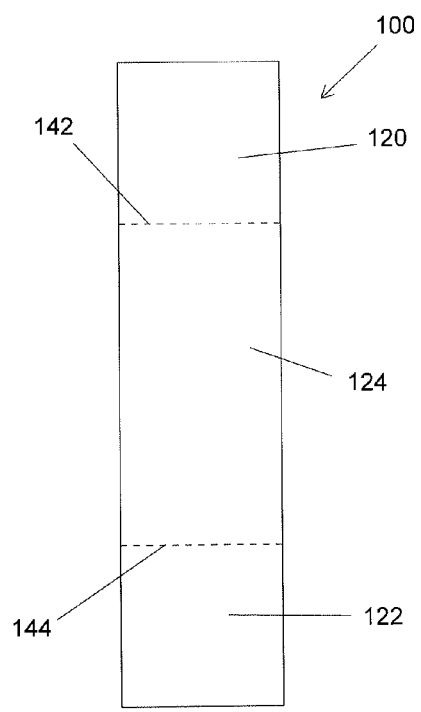
FIG. 4 is a top plan view of the bag of FIG. 3 opened and unfolded in accordance with the present invention.

FIGS. 3 and 4 show a second embodiment of a bag 100 of the present invention. The bag 100 comprises a first front panel 120, a second front panel 122, and a back panel 124. The first front panel 120, the second front panel 122, and the back panel 124 are all connected together at a first end edge 126, a second end edge 128, a first side edge 130, and a second side edge 132 to form the bag 100 for packaging the ground cover material during shipping, handling, and storage. The bag 100 further has a center tear strip 134, a first side tear strip 136, and a second side tear strip 138. The center tear strip 134 interconnects the first front panel 120 and the second front panel 122. The first side tear strip 136 connects the edges of the first front panel 120, the second front panel 122, and the back panel 124 along the first side edge 130. The second side tear strip 138 connects the edges of the first front panel 120, the second front panel 122, and the back panel 124 along the second side edge 132.

In order to use the bag 100 as a weed suppression material, the center tear strip 134, the first side tear strip 136, and the second side tear strip 138 are removed from the bag 100. With the tear strips 134, 136, and 138 removed, the bag 100 is then unfolded as shown in FIG. 4. A first end fold line 142 corresponds to the first end edge 126 of the bag 100, and a second end fold line 144 corresponds to the second end edge 128 of the bag 100. Once the bag 100 has been unfolded as shown in FIG. 4, the ground cover material 14 contained within the bag 100 is spread over the bag 100 in its open and unfolded configuration. Further, as previously stated, other opening indicia, such as sewn seams, perforations, or printed cut lines, can be substituted for the tear strips 134, 136, and 138.

FIGS. 5 and 6 show a third embodiment of a bag 200 of the present invention. The bag 200 comprises a front panel 220 and a back panel 224. The front panel 120 and the back panel 224 are connected together at a first side edge 226, a second side edge 228, a first end edge 230, and a second end edge 232 to form the bag 200 for packaging the ground cover material during shipping, handling, and storage. The bag 200 further has a side tear strip 234, a first end tear strip 236, and a second end tear strip 238. The side tear strip 234 interconnects the front panel 220 and the back panel 224. The first end tear strip 236 interconnects the edges of the front panel 220 and the back panel 224 along the first end edge 230. The second end tear strip 238 interconnects the edges of the front panel 220 and the back panel 224 along the second end edge 232.

In order to use the bag 200 as a weed suppression material, the side tear strip 234, the first end tear strip 236, and the second end tear strip 238 are removed from the bag 200. With the tear strips 234, 236, and 238 removed, the bag 200 is then unfolded as shown in FIG. 6. A side fold line 244 corresponds to the second side edge 228 of the bag 200 (FIG. 5). Once the bag 200 has been unfolded as shown in FIG. 6, the ground cover material 14 contained within the bag 200 is spread over the bag 200 in its open and unfolded configuration. Further, as previously stated, other opening indicia, such as sewn seams, perforations, printed cut lines, can be substituted for the tear strips 234, 236, and 238.

FIGS. 7 and 8 show a fourth embodiment of a bag 300 of the present invention. The bag 300 comprises a front panel 320 and a back panel 324. The front panel 320 and the back panel 324 are connected together at a first end edge 326, a second end edge 328, a first side edge 330, and a second side edge 332 to form the bag 300 for packaging the ground cover material during shipping, handling, and storage. The bag 300 further has an end tear strip 334, a first side tear strip 336, and a second side tear strip 338. The end tear strip 334 interconnects the front panel 320 and the back panel 324. The first side tear strip 336 interconnects the edges of the front panel 320 and the back panel 324 along the first side edge 330. The second side tear strip 338 interconnects the edges of the front panel 320 and the back panel 324 along the second side edge 332.

In order to use the bag 300 as a weed suppression material, the end tear strip 334, the first side tear strip 336, and the second side tear strip 338 are removed from the bag 300. With the tear strips 334, 336, and 338 removed, the bag 300 is then unfolded as shown in FIG. 8. A side fold line 344 corresponds to the second end edge 328 of the bag 300 (FIG. 7). Once the bag 300 has been unfolded as shown in FIG. 8, the ground cover material 14 contained within the bag 300 is spread over the bag 300 in its open and unfolded configuration. Further, as previously stated, other opening indicia, such as sewn seams, perforations, or printed cut lines, can be substituted for the tear strips 334, 336, and 338.

Figure 9:
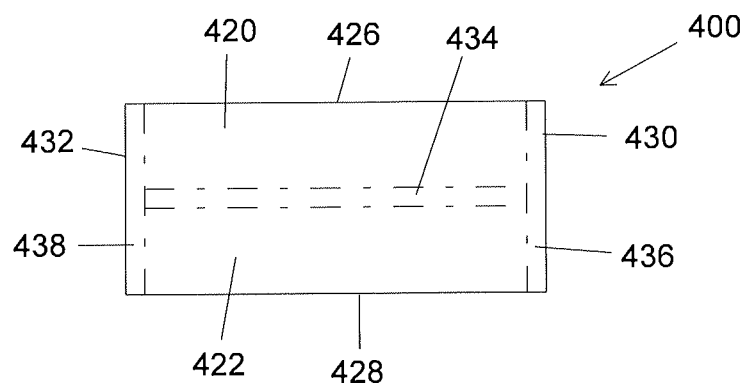
FIG. 9 is a top plan view of a fifth embodiment of an unopened bag with sewn seams, tear strips, perforations, or printed cut lines in an "I" shape in accordance with the present invention.
Figure 10:
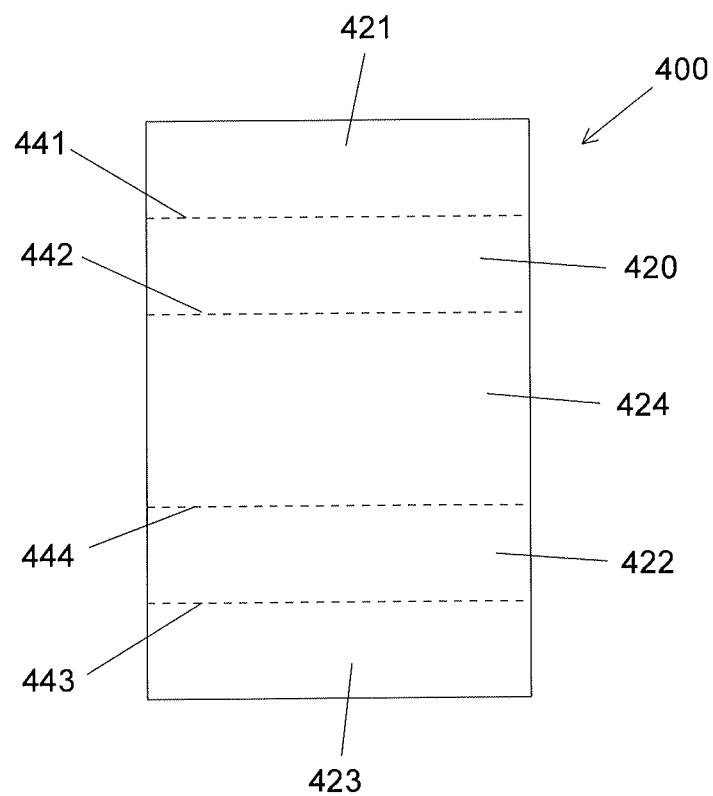
FIG. 10 is a top plan view of the bag of FIG. 9 opened and unfolded and including extra panels in accordance with the present invention.

FIGS. 9 and 10 show a fifth embodiment of a bag 400 of the present invention. The bag 400 comprises a first front panel 420 with an extra underlying panel 421, a second front panel 422 with an extra underlying panel 423, and a back panel 424. The first front panel 420 with its extra underlying panel 421, the second front panel 422 with its extra underlying panel 423, and the back panel 24 are all connected together at a first side edge 426, a second side edge 428, a first end edge 430, and a second end edge 432 to form the bag 400 for packaging the ground cover material during shipping, handling, and storage. The bag 400 further has a center tear strip 434, a first end tear strip 436, and a second end tear strip 438. The center tear strip 434 interconnects the first front panel 420 and the second front panel 422. The first end tear strip 436 interconnects the edges of the first front panel 420, the second front panel 422, and the back panel 424 along the first end edge 430. The second end tear strip 438 interconnects the edges of the first front panel 420, the second front panel 422, and the back panel 424 along the second end edge 432. The underlying panel 421 is hinged to the first front panel 420 adjacent the center tear strip 434 and is folded back underneath the first front panel 420 inside of the bag 400. Likewise, the underlying panel 423 is hinged to the second front panel 422 adjacent the center tear strip 434 and is folded back underneath the second front panel 422 inside of the bag 400. The extra underlying panel 421 and the extra underlying panel 423 may be placed above the first front panel 420 and the second front panel 422, respectively, instead of underlying those front panels 420 and 422.

In order to use the bag 400 as a weed suppression material, the center tear strip 434, the first end tear strip 436, and the second end tear strip 438 are removed from the bag 400. With the tear strips 434, 436, and 438 removed, the bag 400 is then unfolded as shown in FIG. 10. A first side fold line 442 corresponds to the first side edge 426 of the bag 10. A second side fold line 444 corresponds to the second side edge 428 of the bag 400. A third fold line 441 corresponds to the hinged connection between the first front panel 420 and its underlying panel 421. A fourth fold line 443 corresponds to the hinged connection between the second front panel 422 and its underlying panel 423. The extra underlying panels 421 and 423 provide extra weed suppression material to accommodate the volume of ground cover material contained within the bag 400. Once the bag 400 has been unfolded as shown in FIG. 10, the ground cover material 14 contained within the bag 400 is spread over the bag 400 in its open and unfolded configuration with its extra area provided by the extra panels 421 and 423. Further, as previously stated, other opening indicia, such as sewn seams, perforations, or printed cut lines, can be substituted for the tear strips 434, 436, and 438.

Preferably, the bags 10, 100, 200, 300 and 400 are flat tube bags that are sewn at the edges and along one side to provide the opening lines. Other types of bags, such as gusset bags, may be used in connection with the invention.

One construction of bags in accordance with the present invention comprises a tube bag made of three layers of 50 pound basis weight, wet strength Kraft paper. The bags were installed in planting beds with pine bark mulch. Over a seven-month period, the bags had begun to degrade in response to environmental conditions. The bags, however, continued to suppress weed growth at approximately a 90% reduction compared to planting beds without the weed suppression material.

While this invention has been described with reference to preferred embodiments thereof, it is to be understood that variations and modifications can be affected within the spirit and scope of the invention as described herein and as described in the appended claims.

We claim:

1. A weed suppression method for controlling weed in a planting bed having soil, the method comprising:
 a. forming a bag comprising:
  i. a front panel formed from a sheet of weed suppression material;
  ii. a back panel formed from a sheet of weed suppression material, wherein the front panel and the back panel are joined at their edges and their sides to form an enclosed bag and wherein the bag has a bag area; and
  iii. indicia along which the bag is opened so that the bag unfolds into a flat sheet of weed suppression material;
 b. filling the bag with a ground cover having a color and in an amount sufficient to cover the bag area to a predetermined depth;
 c. opening the bag along the indicia and laying the open bag in a flat configuration on the soil; and
 d. spreading the ground cover to the predetermined depth on the bag area of the open bag in the flat configuration.

2. The weed suppression method of claim 1, wherein the weed suppression material is porous.

3. The weed suppression method of claim 1, wherein the weed suppression material is impervious.

4. The weed suppression method of claim 1, wherein the weed suppression material is colored to match the color of the ground cover.

5. The weed suppression method of claim 1, wherein the indicia is selected from the group comprising sewn seams, tear strips, perforations, and printed cut lines.

6. The weed suppression method of claim 1, wherein the weed suppression material is selected from the group comprising a sheet of perforated plastic, biodegradable/compostable plastic film, paper, cardboard, or cloth fabric.

7. The weed suppression method of claim 1, wherein the weed suppression material includes an additive selected from the group comprising fertilizer, pesticide, insecticide, herbicide, or beneficial microbes for release into the underlying soil.

8. The weed suppression method of claim 1, wherein the indicia is located on the edges.

9. The weed suppression method of claim 1, wherein the indicia is located on the sides.

10. The weed suppression method of claim 1 wherein the indicia is located in the front panel.

11. The weed suppression method of claim 1, wherein the indicia is located in the back panel.

12. The weed suppression method of claim 1, wherein the ground cover material is selected from the group comprising mulch, rock material, composted soil, and ground synthetic particles.

13. The weed suppression method of claim 1, wherein the front panel has an extra underlying panel.

14. The weed suppression method of claim 1, wherein the back panel has an extra underlying panel.

\* \* \* \* \*